United States Patent [19]

Garcia

[11] Patent Number: 4,591,731

[45] Date of Patent: May 27, 1986

[54] CIRCUIT FOR CONTROLLING THE STOPPING OF EQUIPMENT

[76] Inventor: José Garcia, 101, rue du Chêne Brûlé-Cercottes, 45400-Fleury-les-Aubrais, France

[21] Appl. No.: 508,117

[22] Filed: Jul. 11, 1983

[30] Foreign Application Priority Data

Jul. 12, 1982 [FR] France ................................ 82 12185

[51] Int. Cl.[4] ............................................ H01H 47/00
[52] U.S. Cl. .................... 307/132 R; 307/114; 307/115; 307/140; 361/160; 361/189; 361/192
[58] Field of Search ....................... 307/31, 34, 38, 39, 307/138 R, 140, 113, 114, 115; 417/216, 426; 315/318, 320, 322; 361/160, 189, 191, 192, 170, 171, 173, 177, 182

[56] References Cited

U.S. PATENT DOCUMENTS 3,514,626  5/1970  Platzer, Jr. ...................... 307/140 X
4,101,786  9/1978  Ruggles et al. ................. 307/140 X
4,208,593  6/1980  Sullivan ............................ 307/39 X
4,378,507  3/1983  Rost ................................ 307/115 X

FOREIGN PATENT DOCUMENTS 931902   8/1955  Fed. Rep. of Germany .
2816876  4/1978  Fed. Rep. of Germany .

Primary Examiner—A. D. Pellinen
Assistant Examiner—Derek S. Jennings
Attorney, Agent, or Firm—Pearne, Gordon, Sessions, McCoy, Granger & Tilberry

[57] ABSTRACT

The circuit for controlling the stopping of equipment comprises a switch with two contacts and with a pushbutton able to bring about the switching of the contacts into an open position and a closed position. The circuit comprises a supplementary member which functions like the pushbutton and is controlled by a relay in series with one of the contacts of the switch, this relay being responsive to a remote control device.

9 Claims, 8 Drawing Figures

CIRCUIT FOR CONTROLLING THE STOPPING OF EQUIPMENT

BACKGROUND OF THE INVENTION

The present invention relates to a circuit for controlling the stopping of equipment. It is more particularly used in the realisation of programmable systems for the remote switching off of lights. The present circuit is more particularly suitable for systems used for cutting down the amount of electric power consumed by artificial lighting sources (bulbs, lamps, tubular discharge lamps, projectors, etc). It can be used with advantage in such installations having a large number of autonomous lighting subassemblies.

At present, lighting means are switched off by a master switch, which cuts off the power supply. This solution has the double disadvantage of leading to a definitive switching off of all the lighting means, without it being possible to immediately switch on some of them again and to put back into service all these means on restoring the power supply, which is not necessarily justified.

SUMMARY OF THE INVENTION

The circuit of the present invention is intended to obviate these disadvantages. Thus, it offers the possibility of putting certain lights back into service after they have been switched off, but does not permit an overall switch-on, which can only take place by means of the control for each means.

The device according to the invention is very well suited to the switch rooms of large telephone exchanges having a large number of bay-mounted lights. However, it can also be used in offices, workshops, depots, dwelling rooms, etc. The device according to the invention also applies to members other than lighting means, such as motors, radiators, fans, air conditioning means, machines, miscellaneous equipment, etc.

In the case of electrical equipment, the power necessary for the supply can come from a random single, two or three phase network, which can be high or low voltage, alternating or direct current.

The invention also applies to the control of equipment supplied with energy other than electrical power, e.g. pneumatic or hydraulic energy.

Apart from an energy saving, the circuit according to the invention permits an equipment savings by reducing the use time thereof and manpower economies by reducing maintenance.

All these objectives are achieved according to the invention in the following way. The equipment whose stopping is to be controlled is, in conventional manner, supplied with power across a switch having one or more contacts. This switch is controlled by at least one pushbutton for alternately switching it into an open position and a closed position. The circuit according to the invention comprises a supplementary control member for said switch, which is functionally equivalent to the pushbutton, but which is controlled by a relay arranged in series with one of the switch contacts and which is connected to remote control means. Thus, the relay can only be controlled if the contact associated therewith in the switch is closed, i.e. if the apparatus is in operation. In this case, the control of the relay causes the switching of the switch into the open position and consequently stops the apparatus. Conversely, it is not possible to control the relay if the switch is in the open position. Thus, the remote control means are unable to put back the stopped apparatus into service. This can only be done by the pushbutton or pushbuttons associated with said apparatus.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
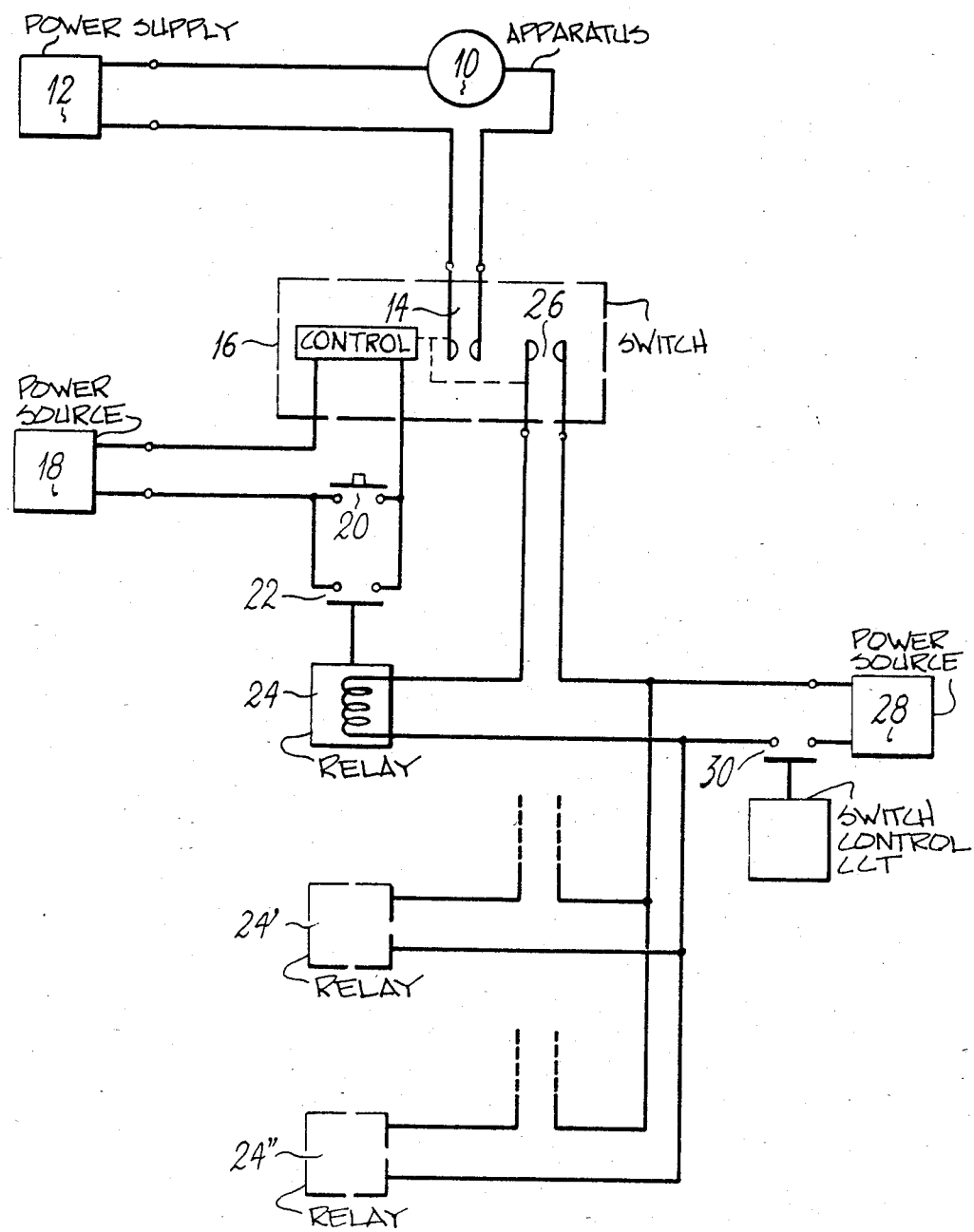
FIG. 1 a circuit diagram of the invention.

The device shown in FIG. 1 comprises a random apparatus 10 connected to an electric power supply 12 via a contact 14 belonging to a switch 16. The latter is supplied by a source 18 and is controlled by a pushbutton 20. The depression of the button successively brings about the opening and closing of the switch and therefore the stopping and starting of apparatus 10.

According to the invention, the device also comprises a supplementary member 22 for controlling switch 16. This member is functionally equivalent to the pushbutton 20, in the sense that it brings about the opening or closing of switch 16. Member 22 is actuated by a relay 24 in series with a contact 26 belonging to switch 16 and controlled in synchronism with contact 14. Moreover, relay 24 is supplied by a source 28 and is remotely controlled by means 30.

This switch operates in the following way. Pushbutton 20 constitutes a control member for apparatus 10, so that it can stop or start the latter. In operation, the two contacts 14 and 26 are closed. When stopped, they are both open. Assuming that apparatus 10 is operating, action on switch 16 brings about the stopping thereof. This action can be performed either by pushbutton 20, or by member 22. In the first case, switching off is manual and is performed by the operator. In the second case, it is a centralized remote control action. For this purpose, it is merely necessary to close means 30, which excites relay 24 and brings about the opening of contact 14 and consequently the stopping of apparatus 10.

Following these operations, contact 26 is open, so that it is no longer possible to act on relay 24 and consequently on member 22. This means that the remote control means 30 cannot start up apparatus 10. The latter can only be brought about by the control means of switch 16, i.e. by acting on pushbutton 20 in the present case. In other words, the closing of contact 30 makes it possible to remotely control the stopping of apparatus 10, if the latter is operating, but has no effect on the installation if it is stopped.

Figure 8:
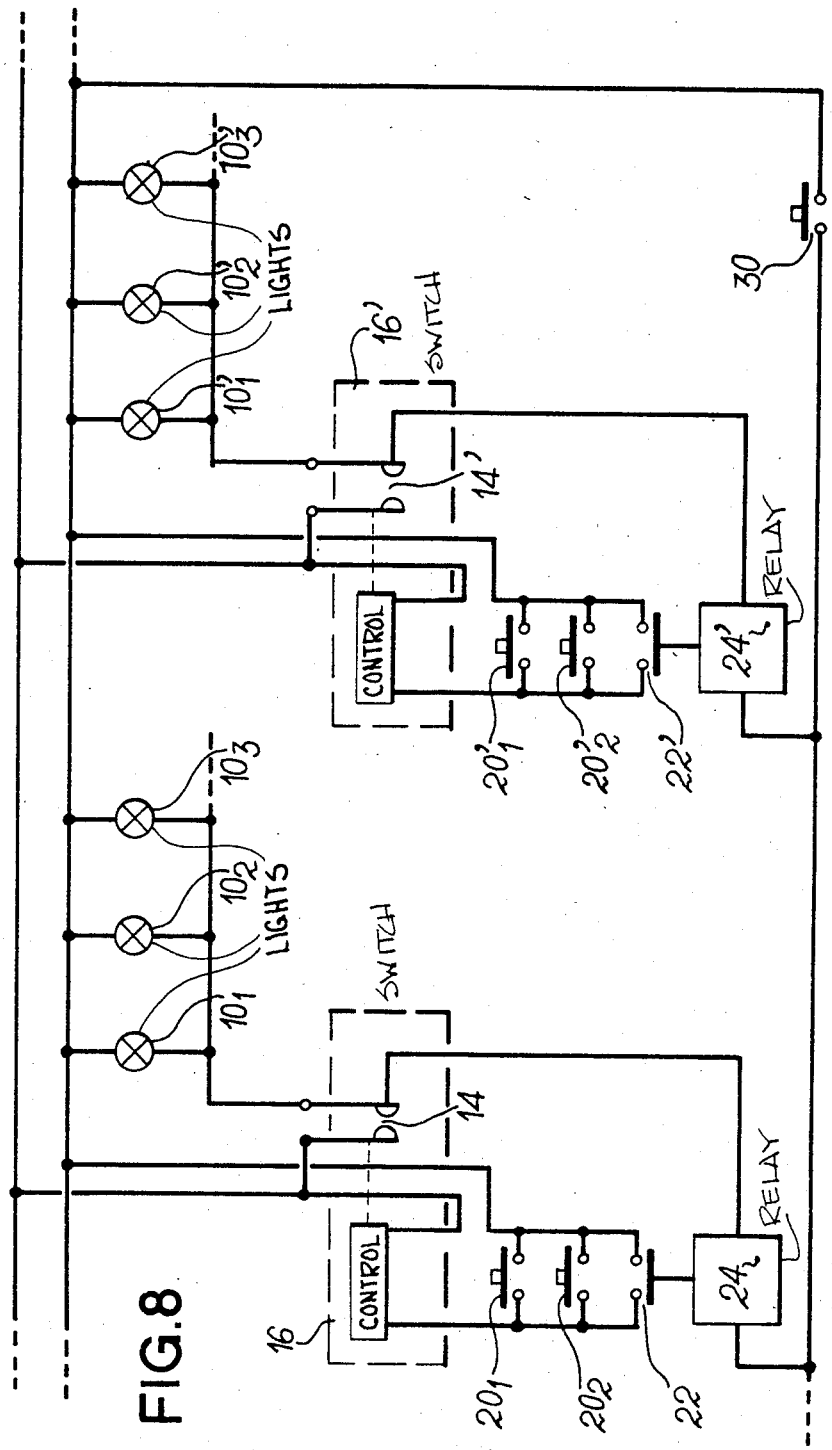
FIG. 8 a variant in which the contact controlling the supply for the equipment, whose stopping is to be controlled, is placed in series with the remote control circuit.

In actual fact, the supply means 28 and remote control means 30 are common to a certain number of subassemblies, each having a relay 24, 24', 24", etc connected in series with a contact of the switch belonging to said subassembly. Thus, the closing of contact 30 brings about the stopping of all the equipment in operation in these subassemblies, but has no effect on them when stopped. In certain variants, contacts 14 and 26 can be combined, as illustrated in FIG. 8.

The following drawings illustrate a number of embodiments, in the case where apparatus 10 is an electrical member supplied from a power supply network. In this case, switch 16 is a remote action switch and makes it possible to control an apparatus by means of several pushbuttons located at different points.

Figure 2:
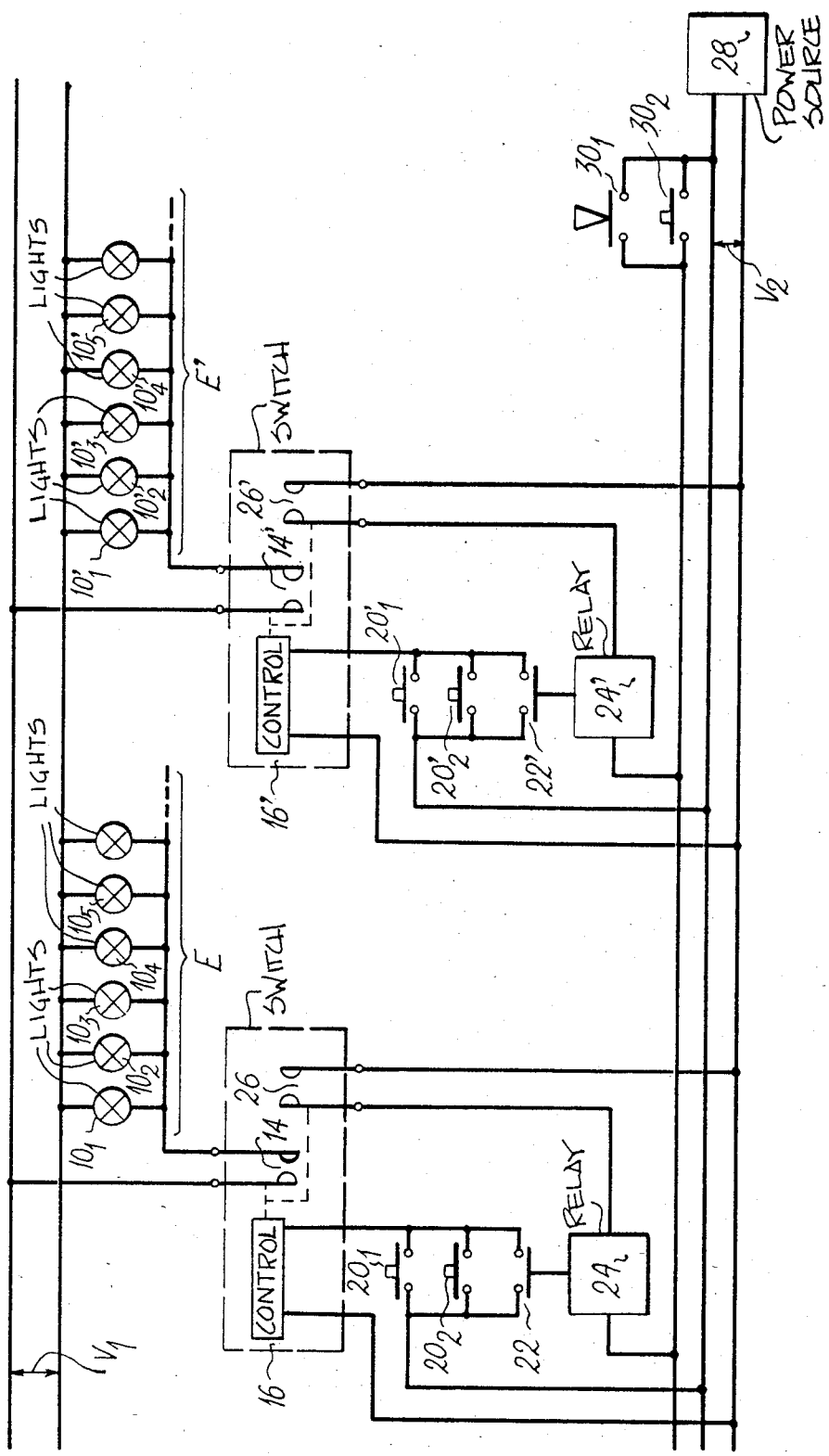
FIG. 2 a first embodiment in which the supply for the relay is independent of that for the equipment.
Figure 3:
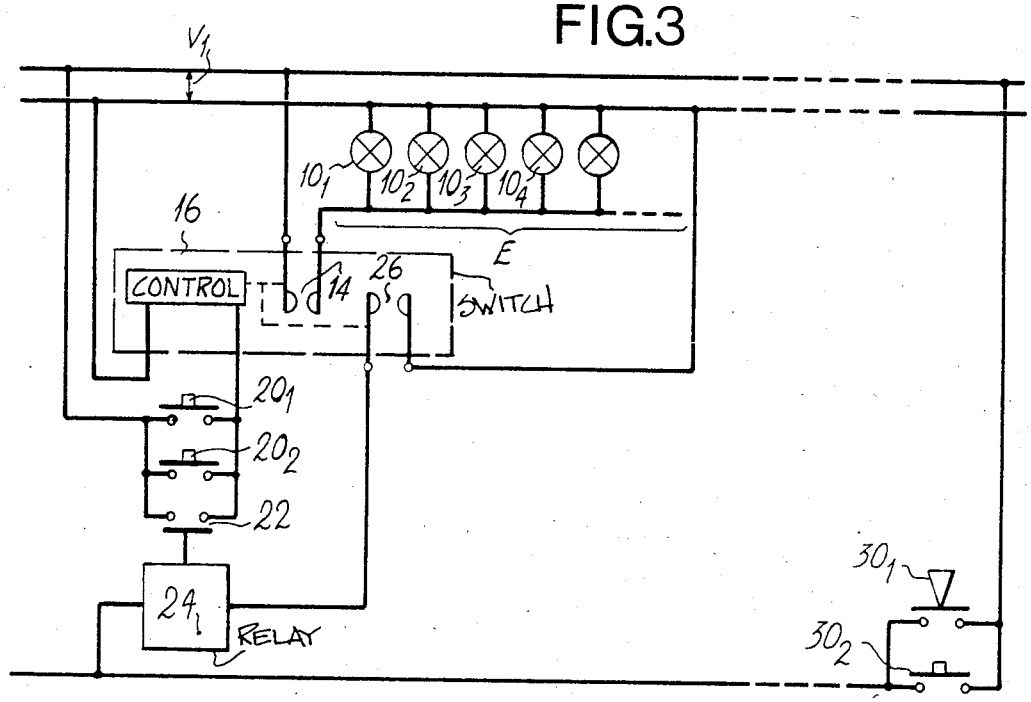
FIG. 3 a variant in which the supply for the relay is provided by the line used for supplying the equipment.

FIG. 2 shows two assemblies E and E' of lights $10_1$, $10_2$, $10_3$, etc and $10'_1$, $10'_2$, $10'_3$, etc respectively supplied across remote action switches 16, 16', whereof a contact 14, 14' is in series with a supply line supplying a voltage $V_1$. Each of the remote action switches is controlled by two pushbuttons $20_1$, $20_2$ and $20'_1$ and $20'_2$ and by a supplementary contact 22, 22' controlled by a relay 24, 24'. The relay is in series with one of the contacts 26, 26' of the remote action switch. A power supply 28 supplies a voltage $V_2$, used both for remote action switches 16, 16' and relays 24, 24'. The control means for the relays comprise a programmable control contact $30_1$ and a manual control pushbutton $30_2$. Contact $30_1$ can be controlled by a clock, a photodetector or any other means, as a function of the conditions of use. The diagram of FIG. 3 differs from that of FIG. 2 only through the fact that the remote action switch 16 and relay 24 are supplied by the supply voltage $V_1$ for the lamps and not by an autonomous source.

Figure 4:
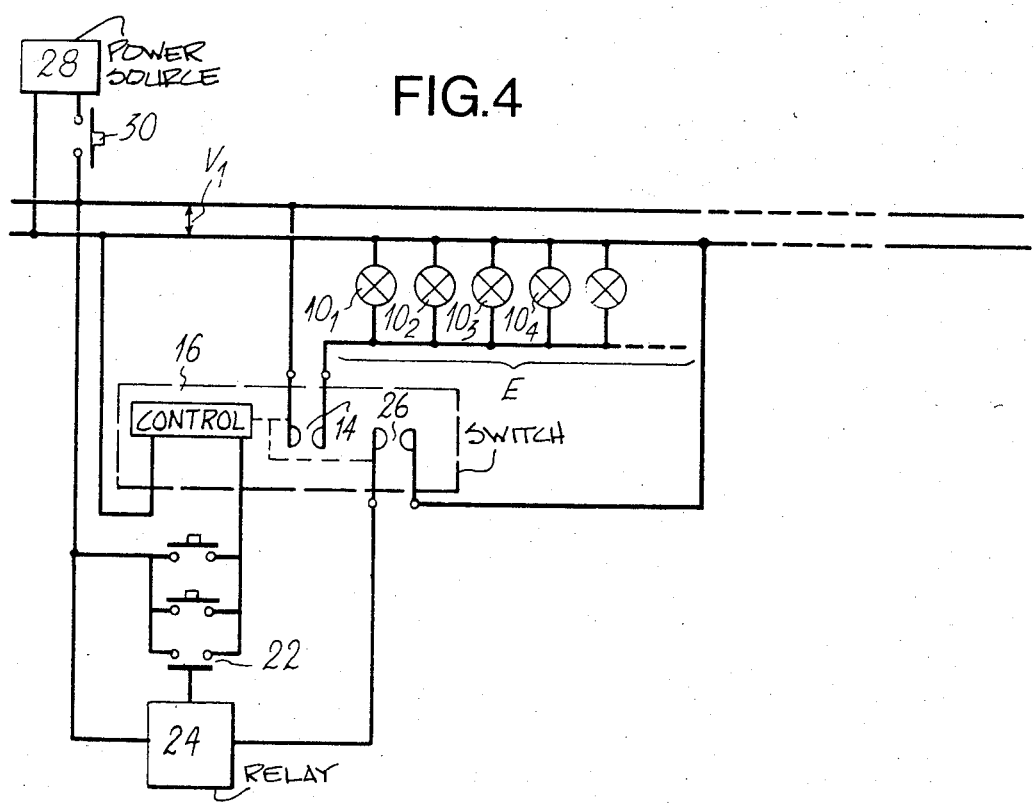
FIG. 4 a variant in which the relay control signal is superimposed on the supply voltage for the equipment.

In the circuit of FIG. 4, the voltage applied to relay 24 results from the superimposing of the voltage supplied by source 28 and the supply voltage for the lamps. The voltage supplied by source 28 has a special characteristic to which the relay is sensitive. It can be a voltage in the form of short pulses, or a voltage having an appropriate frequency. Another possibility is to interrupt the supply voltage $V_1$, with the aid of its own switch according to a predetermined code, recognised by the relay.

Figure 5:
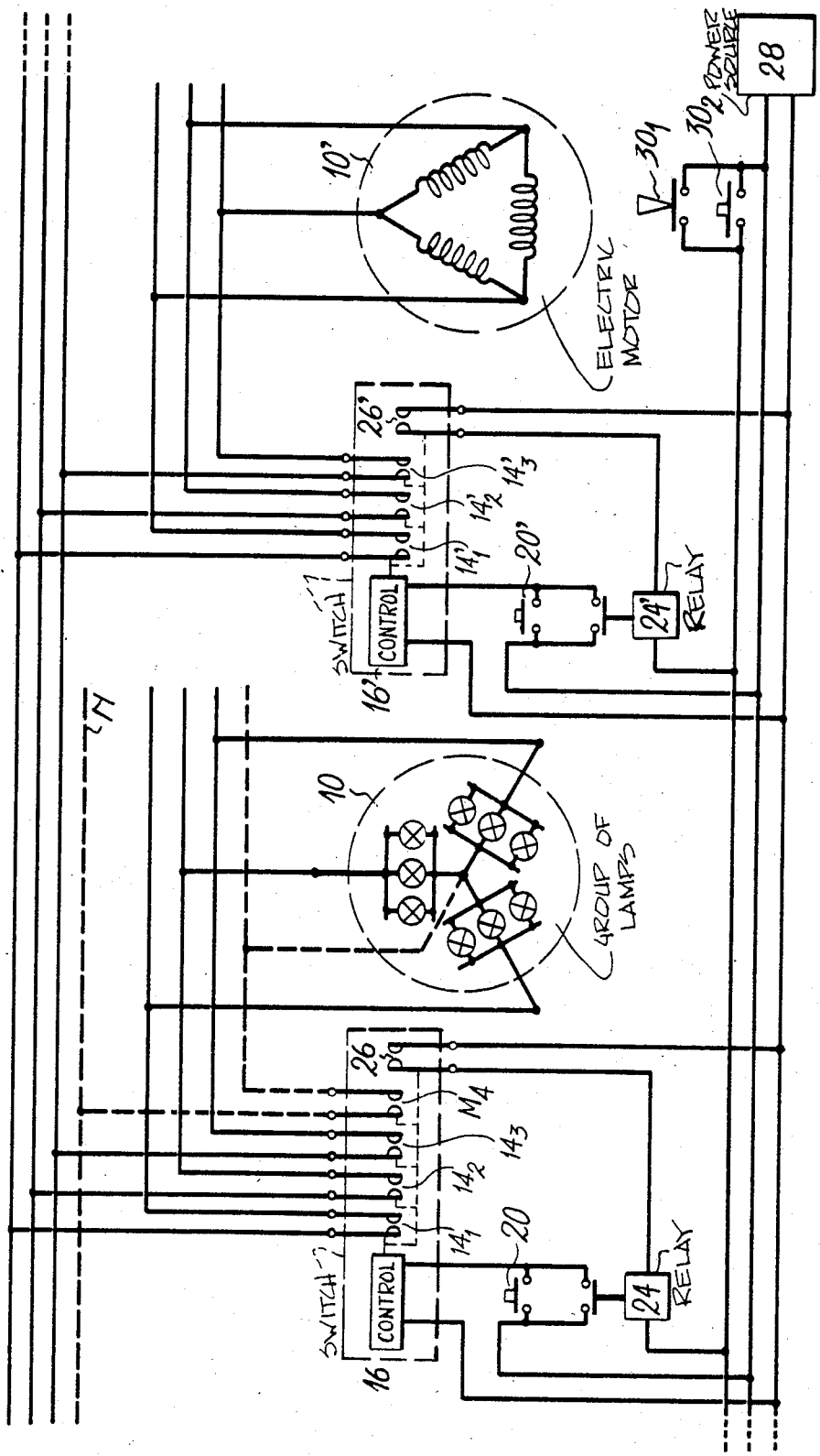
FIG. 5 a circuit diagram of the circuit according to the invention in the case of a three-phase current supply.

FIG. 5 shows a variant in which the electrical power supply is three-phase. The remote action switch then comprises one contact per phase, i.e. three contacts $14_1$, $14_2$, $14_3$, to which are added a contact $M_4$ for the neutral, when the latter is necessary (line N). The apparatus to be supplied is in the present case a group of lamps 10 in the left-hand part and a delta connected electric motor 10' in the right-hand part.

Figure 6:
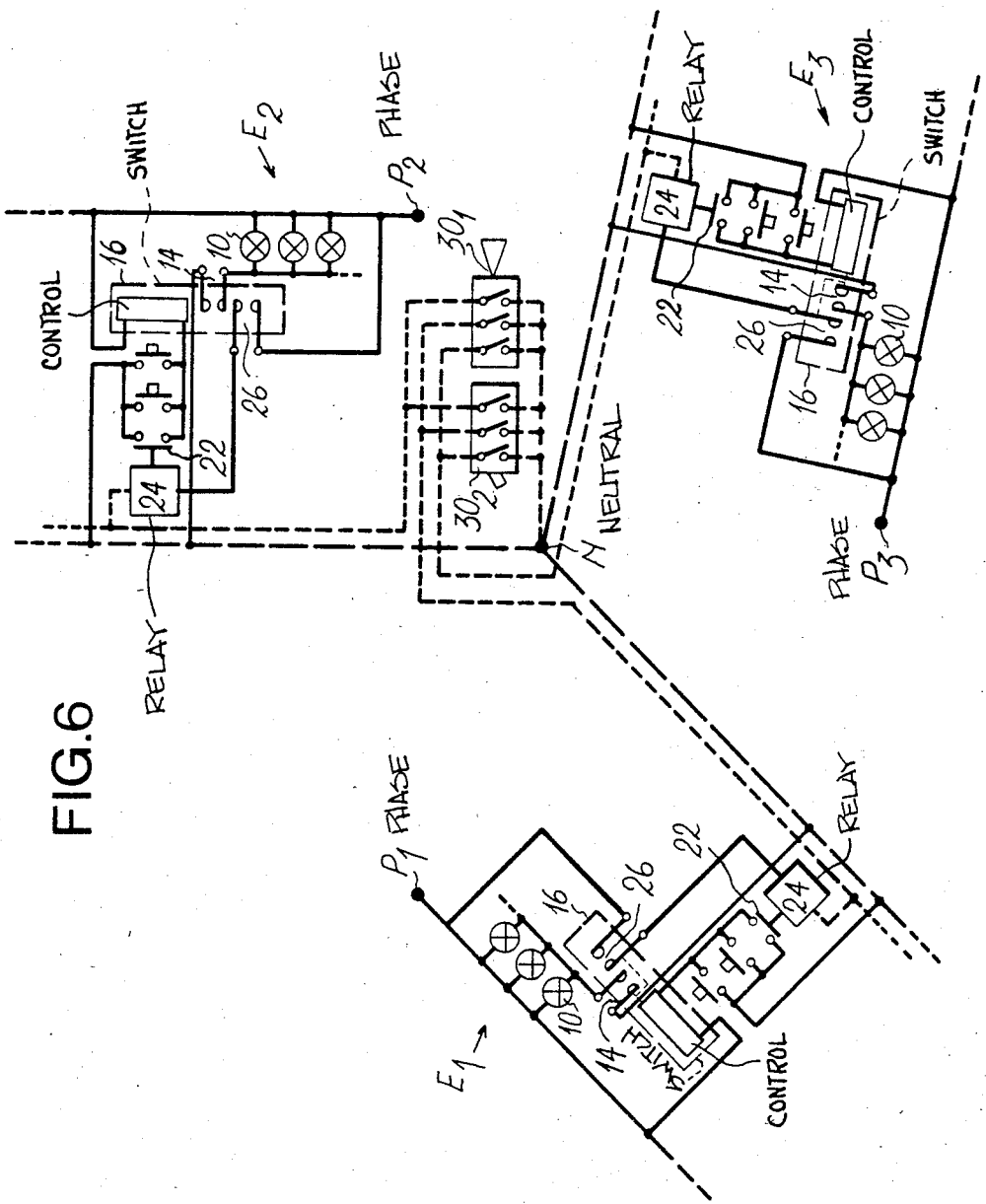
FIG. 6 another three-pha-se current variant.

FIG. 6 once again refers to a three-phase installation, but with a neutral N. The three phases $P_1$, $P_2$, $P_3$ supply three lighting systems $E_1$, $E_2$, $E_3$. The programmable control contact 31 and manual control contact $30_2$ are in this case triple contacts associated with the three phases.

Figure 7:
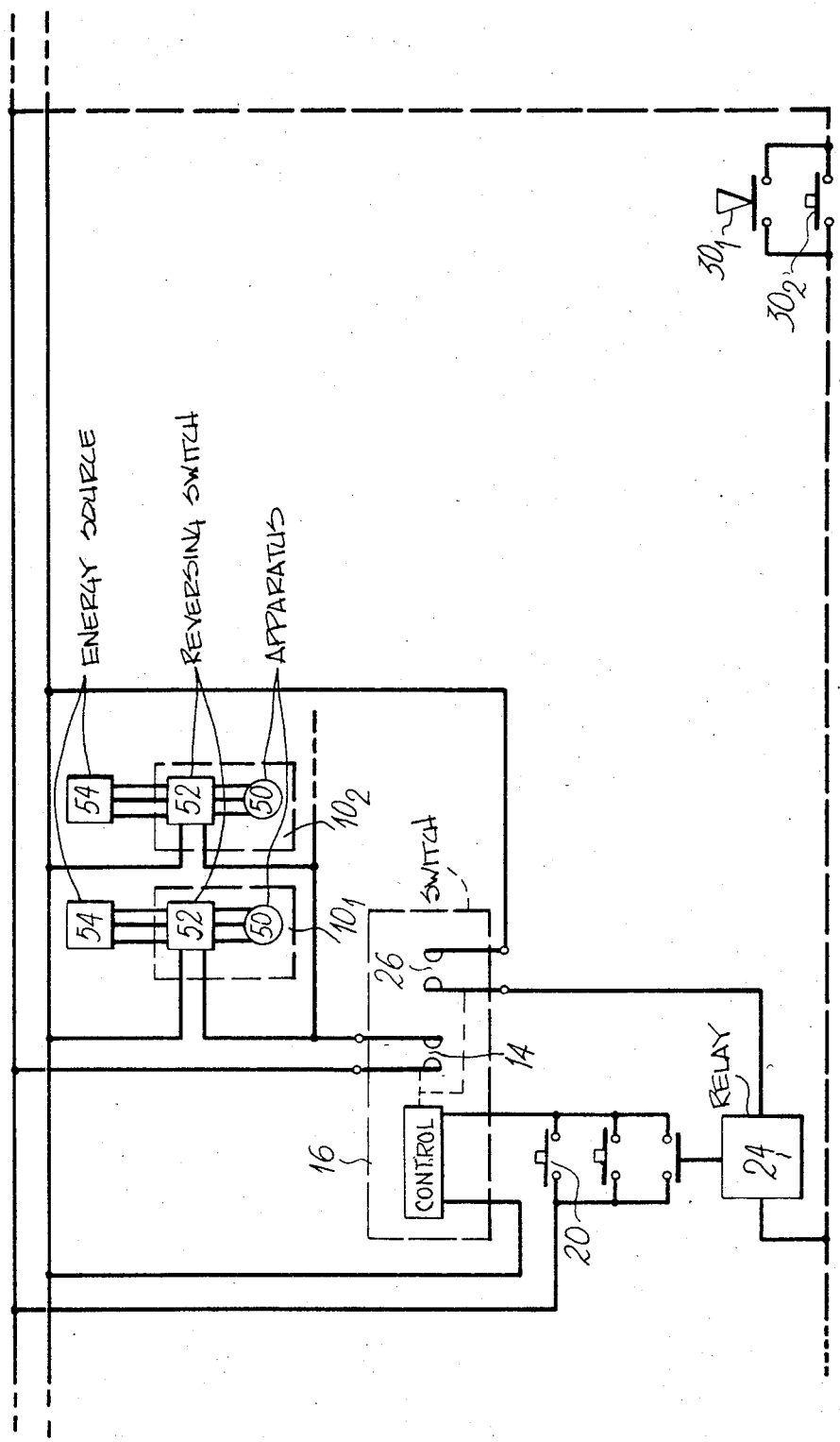
FIG. 7 an embodiment in which the equipment is constituted by receivers, equipped with reversing switches.

FIG. 7 illustrates a variant in which the apparatus to be controlled is a member 50 associated with a reversing switch 52 having two positions, i.e. stop and go. The stop control circuit again comprises a relay 24 and a contact 26, but in this case it acts on reversing switch 52 and not directly on apparatus 50. The latter is supplied by an energy source 54 of a random nature (electrical, hydraulic, etc). In this case, apparatus 50 can be a motor, a radiator, a refrigerating unit, a heat pump, etc.

Finally, FIG. 8 illustrates a variant in which the contact of the switch controlling the supply of the equipment whose stopping is to be controlled, is placed in series with the remote control circuit 30, the single contact 14' representing contacts 14 and 26 in the preceding variants.

The aforementioned remote control means 30 can be in many different forms. Thus, it can consist of a pushbutton, which the operator operates at random, e.g. at the end of the day or during off-peak hours. However, it can also comprise an automatic means using a detector determining the appropriate time for switching off. When applied to lighting installations, this detector can be a photodetector sensitive to ambient light and which controls the switching off of the lamps when the natural lighting level makes artificial lighting unnecessary.

The advantages of the invention have become clearly apparent from the above description. In the case of switching off on an overall basis, it is naturally possible to switch off lights which have remained on unnecessarily, but this action does not enable each user to switch on his own light again (justified e.g. in the case of a projection room). Moreover, the prior art procedure suffers from the disadvantage of bringing about the switching on again of all the lights, whose operation had previously been interrupted, during the reenergising of the installation, which is generally inappropriate. By means of the circuit according to the invention, the power supply network for the lights is not interrupted, but is merely placed in an inoperative state, from which each light can be switched on again in an autonomous manner.

What is claimed is:

1. A circuit for controlling the stopping of equipments, each individual equipment being connected to a power supply and being provided with a switch having at least one contact, said switch being associated with at least one pushbutton able to bring about the alternate switching of said contact into an open position and a closed position, wherein said circuit comprises a supplementary member for controlling the switch, said member being functionally equivalent to the pushbutton, said member being controlled by a relay in series with one of the contacts of the switch, said relay being responsive to remote control means for switching said switch.

2. A circuit according to claim 1, wherein the remote control means of the relay comprises a power supply independent of the supply network for the equipment.

3. A circuit according to claim 1, wherein the remote control means of the relay is connected to a power supply, which is a power supply for the equipments.

4. A circuit according to claim 1, wherein the remote control means of the relay comprises an electrical source connected to the power supply, the relay being sensitive to said electrical source.

5. A circuit according to claim 1, wherein the network of the power supply is a three-phase type with a neutral, the switch comprising, for each equipment, at least three contacts, one for each phase and one for the neutral.

6. A circuit according to claim 1, wherein the remote control means of the relay comprise an automatic control switch.

7. A circuit according to any one of the claims 1 to 5, wherein the equipment are electrical members.

8. A circuit according to any one of the claims 1 to 5 wherein the equipment consists of lighting means.

9. A circuit according to claim 1, wherein the remote control means of the relay comprise a manual control switch.

* * * * *